J. L. & T. R. BRITT.
Churns.

No. 143,612. Patented Oct. 14, 1873.

Witnesses:
Gustave Dieterich
Kilpatrick

Inventor:
J. L. Britt
T. R. Britt
Per
Attorneys.

UNITED STATES PATENT OFFICE.

JOSEPH L. BRITT AND TROY R. BRITT, OF RALEIGH, NORTH CAROLINA.

IMPROVEMENT IN CHURNS.

Specification forming part of Letters Patent No. 143,612, dated October 14, 1873; application filed August 4, 1873.

*To all whom it may concern:*

Be it known that we, JOSEPH L. BRITT and TROY R. BRITT, of Raleigh, in the county of Wake and State of North Carolina, have invented a new and Improved Churn, of which the following is a specification:

Our invention consists of a peculiar and simple arrangement of supports for the dashers and operating mechanism, the said supports being mounted on the churn-top, so that the dashers and driving-gear are all removed when the cover is taken off, to afford unobstructed access to the churn-case.

Figure 1:
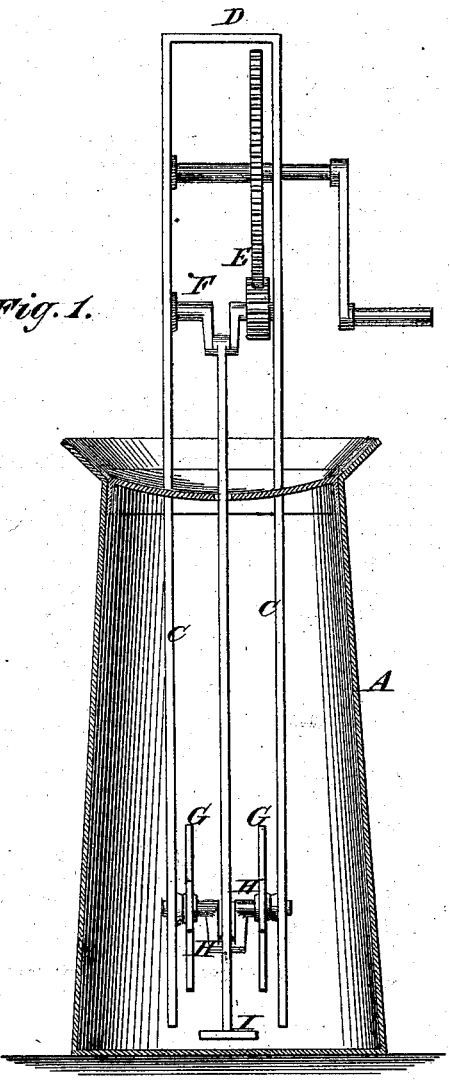
Figure 2:
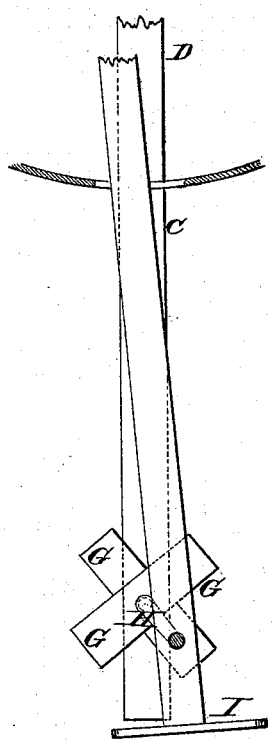

Figure 1 is a sectional elevation of a churn constructed according to our invention. Fig. 2 is a side elevation of the dashers and section of the cover and lower crank-shaft.

Similar letters of reference indicate corresponding parts.

A is the churn-case, and B the cover, which may be of any form or kind adapted for the use of a dasher. To the cover is attached a long rectangular frame, composed of two vertical parallel bars, C, and a top cross-bar, D. The bars extend above the top of the churn-cover sufficiently to support the driving-gear E and crank-shaft F, and they extend below the cover nearly to the bottom of the churn, near which two rotary dashers, G, are mounted on a horizontal crank-shaft, H. I is the dasher; it is connected at the upper end to the crank-shaft F, to be worked by it, and at the lower end to the crank-shaft H, to work the rotary dashers. The dasher works freely through a slot or hole in the churn; top bars C are firmly attached to the top. The combined action of the two dashers intensifies the agitation of the cream largely, and correspondingly shortens the time required to produce the butter.

The arrangement of apparatus for producing the two actions is very simple and cheap.

Having thus described our invention, we claim as new and desire to secure by Letters Patent—

The rotating dashers, reciprocating dasher, and the operating-gear arranged in the frame C D, and said frame attached to the removable churn-top, substantially as specified.

JOSEPH LEONARD BRITT.
   TROY RANDOLPH BRITT.

Witnesses:
 W. W. WHITE,
 WM. H. HAYWOOD.